US007010266B2

(12) United States Patent
Hudson et al.

(10) Patent No.: US 7,010,266 B2
(45) Date of Patent: Mar. 7, 2006

(54) POWER CONTROL SYSTEMS AND METHODS FOR USE IN SATELLITE-BASED DATA COMMUNICATIONS SYSTEMS

(75) Inventors: Erwin Hudson, Englewood, CO (US); Kenneth Westall, Englewood, CO (US); Robert Luly, Littleton, CO (US)

(73) Assignee: Viasat, Inc., Carlsbad, CA (US)

( * ) Notice: Subject to any disclaimer, the term of this patent is extended or adjusted under 35 U.S.C. 154(b) by 477 days.

(21) Appl. No.: 09/864,431

(22) Filed: May 24, 2001

(65) Prior Publication Data

US 2002/0177404 A1 Nov. 28, 2002

(51) Int. Cl.
*H04B 7/185* (2006.01)

(52) U.S. Cl. .............................. 455/13.4; 7/427; 7/430
(58) Field of Classification Search ............... 455/13.4, 455/427, 12.1, 430, 7; 375/222; 330/285, 330/296
See application file for complete search history.

(56) References Cited

U.S. PATENT DOCUMENTS

| 4,038,600 A | 7/1977 | Thomas |
| 4,578,633 A * | 3/1986 | Aoki ........................... 323/315 |
| 4,752,967 A | 6/1988 | Bustamante et al. |
| 5,426,395 A * | 6/1995 | Cygan ..................... 330/207 P |
| 5,940,025 A | 8/1999 | Koehnke |
| 6,035,008 A | 3/2000 | Kim |
| 6,298,244 B1 * | 10/2001 | Boesch et al. ........... 455/553.1 |
| 6,353,360 B1 | 3/2002 | Hau et al. |
| 2002/0132580 A1 * | 9/2002 | Buer ......................... 455/13.4 |
| 2003/0102924 A1 * | 6/2003 | Matsumoto et al. ........ 330/310 |

FOREIGN PATENT DOCUMENTS

| EP | 0 473 299 A | 3/1992 |
| JP | 04351021 A | 12/1992 |
| JP | 2000295048 A | 10/2000 |
| WO | WO 99/21291 A1 | 4/1999 |
| WO | WO 00/25445 A | 5/2000 |

* cited by examiner

*Primary Examiner*—Nay Maung
*Assistant Examiner*—Raymond S. Dean
(74) *Attorney, Agent, or Firm*—Snell & Wilmer L.L.P.

(57) ABSTRACT

Control systems and methods for limiting the amount of input signal power that may be provided to a transmitter or transceiver unit within a satellite-based data communications system are disclosed. In one innovative aspect a DC current into a power amplifier provided within the transmitter or transceiver unit is monitored, either directly or indirectly, to determine when the power amplifier is approaching the limits of its normal or prescribed range of operation, and thereafter an application of input signal power to the transmitter or transceiver unit may be limited or discontinued.

16 Claims, 4 Drawing Sheets

POWER CONTROL SYSTEMS AND METHODS FOR USE IN SATELLITE-BASED DATA COMMUNICATIONS SYSTEMS

BACKGROUND OF THE INVENTION

The present invention relates generally to satellite-based data communications systems and, more particularly, to power control systems for use with satellite modems and transmitter or transmitter/receiver (transceiver) units incorporated in such systems.

When operating a satellite-based data communications system, it is often important that all communication signals received by a given satellite have similar strengths. One reason for this is that, if one signal reaching a satellite is significantly stronger than the other signals reaching the satellite, then the significantly stronger signal may interfere with the other signals and, in doing so, may cause data carried by the other signals to be corrupted.

Although numerous phenomena (location in a beam, antenna pointing, etc.) may cause signal attenuation in satellite-based data communications systems, adverse weather is, perhaps, the most frequently encountered. The reason for this is that rain, clouds, and other adverse weather may cause signals transmitted by the transmitter or transceiver units of a satellite-based data communications system to be significantly attenuated and, thus, to have a reduced signal strength upon reaching a satellite.

To compensate for weather-induced signal attenuation, many satellite-based data communications systems employ various types of power control feedback to adjust the level of communication signals radiated by earth stations. For example, typical power control systems allow transmission signal strengths to be increased during periods of bad weather, thus compensating for any signal attenuation that may result from the weather. However, as is well known in the art, the input signal power that may be provided to a given transmitter or transceiver unit must be limited to prevent overdrive, which may cause the signals generated by the transmitter or transceiver unit to be significantly degraded. In short, if too much input signal power is provided to the power amplifier provided within a transmitter or transceiver unit, then the power amplifier may lose its ability to properly amplify signals and, in many instances, will generate significant amounts of in-band and out-of-band signal distortion. The in-band signal distortion may cause loss of communications connectivity on the link, and the out-of-band distortion may cause substantial interference with other signals being received by a satellite.

Accordingly, it is an object of the present invention to provide an improved power control system for use with satellite-based data communications systems.

SUMMARY OF THE INVENTION

In one innovative aspect, the present invention is directed to systems and methods for controlling an amount of input signal power to be provided to a transmitter or transceiver unit of a satellite-based data communications system by monitoring an amount of DC current provided to a power amplifier provided within the transmitter or transceiver unit, determining based upon a predetermined characteristic of the monitored DC current when additional input signal power to the power amplifier will drive the amplifier beyond its normal operating characteristics, and restricting the application of additional input signal power to the power amplifier, when the monitored DC current exhibits the predetermined characteristic.

In one preferred embodiment, the DC current provided to the power amplifier is monitored to determine when that current reaches a plateau, and following that point, no additional input signal power will be provided to the power amplifier of the transmitter or transceiver unit. In an alternative embodiment, the signal power may be adjusted by an automatic gain control or automatic level control circuit within the transmitter or transceiver unit when the monitored DC current begins to plateau.

In another innovative aspect, the present invention is directed to systems and circuits for effecting the current monitoring and power regulation functions described above. In one such embodiment, a current monitor is utilized to directly monitor the DC current provided to an input of the power amplifier. The current monitor preferably is coupled to a comparator circuit, which in turn, is coupled to a telemetry circuit. The telemetry circuit then may be used to deliver power control data to a satellite modem, or other power regulation circuitry, associated with the transmitter or transceiver unit.

As can be appreciated by those skilled in the art, the present invention not only addresses significant shortfalls in conventional power control system technology such as direct power measurement of a radio frequency signal, but also provides several new and innovative features. In particular, the present invention allows for satellite or satellite communications network initiated control of transmitter or transceiver unit input signal power output, while ensuring that the power amplifiers provided within those units are not pushed beyond their normal or prescribed operating parameters. These and other advantages of the present invention are described more filly herein.

BRIEF DESCRIPTION OF THE DRAWINGS

Various objects and advantages of the present invention are apparent and more readily appreciated by reference to the following Detailed Description and to the appended claims when taken in conjunction with the accompanying Drawings, wherein:

DETAILED DESCRIPTION

Figure 1:
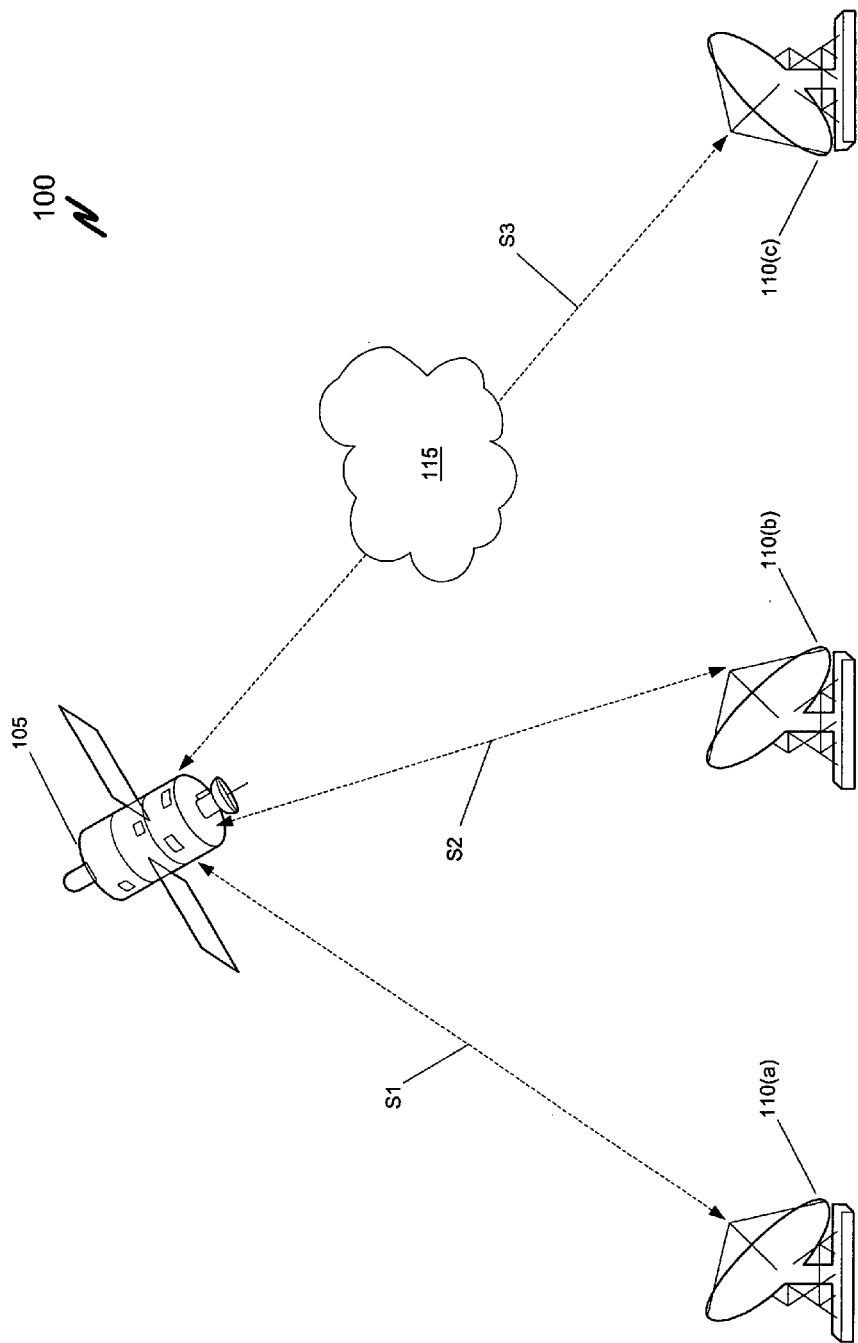
FIG. 1 illustrates a typical satellite-based data communications system employing at least one satellite, a plurality of ground-based transmitter or transceiver units, and a plurality of satellite modems associated with those units.

FIG. 1 provides an illustration of a typical satellite-based data communications system 100 that includes at least one satellite 105, a plurality of transmitter or transceiver units 110(a)–(c), and a plurality of satellite modems (not shown) associated with the transmitter or transceiver units 110(a)–(c). To simplify the discussion herein, the term "transmitter unit" shall be used hereafter to refer to both transmitter units and transceiver units.

As explained above, it is desirable to balance the intensities of all of the communication signals S1, S2, and S3 received by the satellite 105, so that the signals S1, S2, and S3 do not interfere with one another. This is particularly important when, for example, one of the signals (e.g., signal S3) must travel through a dense rain cell 115, or other adverse weather conditions. When that occurs, the signal S3 passing through the rain cell 115 may be significantly attenuated, making reception of that signal more difficult, and increasing the likelihood that signals S1 and S2 will interfere with proper reception of the signal S3.

To compensate for the attenuation of signal S3 that results from the rain cell 115, it may be desirable to increase the input signal power provided to the transmitter unit 110(c), thereby increasing the initial strength of signal S3, and allowing signal S3 to be balanced with signals S1 and S2 upon receipt by the satellite 105. To provide for such an increase in transmission signal strength, the satellite 105 or satellite communications network through satellite 105 may simply monitor the relative strengths of the signals that it receives and communicate, as appropriate, messages to any transmitter units 110(a)–(c) that need to increase their power output.

The above described technique for balancing signal strengths is useful, until the power amplifier circuits 240 (shown in FIGS. 2 and 3) are forced to exceed their normal or prescribed operating characteristics. When this occurs, the quality of the output signals generated by the power amplifier circuits 240 degrades significantly, and substantial interference with other signals often results. Thus, it is important to control the amount of power applied to the amplifier circuits 240 provided within the transceiver units 110(a)–(c), to ensure that those circuits are not overdriven and forced to operate outside of their normal or prescribed zones of operation.

In one particularly innovative aspect, the present invention is directed to systems and methods for ensuring that the power amplifier circuits 240 provided within the transmitter units 110(a)–(c) are not forced to operate outside of their normal range of operation and into overdrive. Exemplary embodiments of such a system are illustrated in FIGS. 2 and 3.

Figure 2:
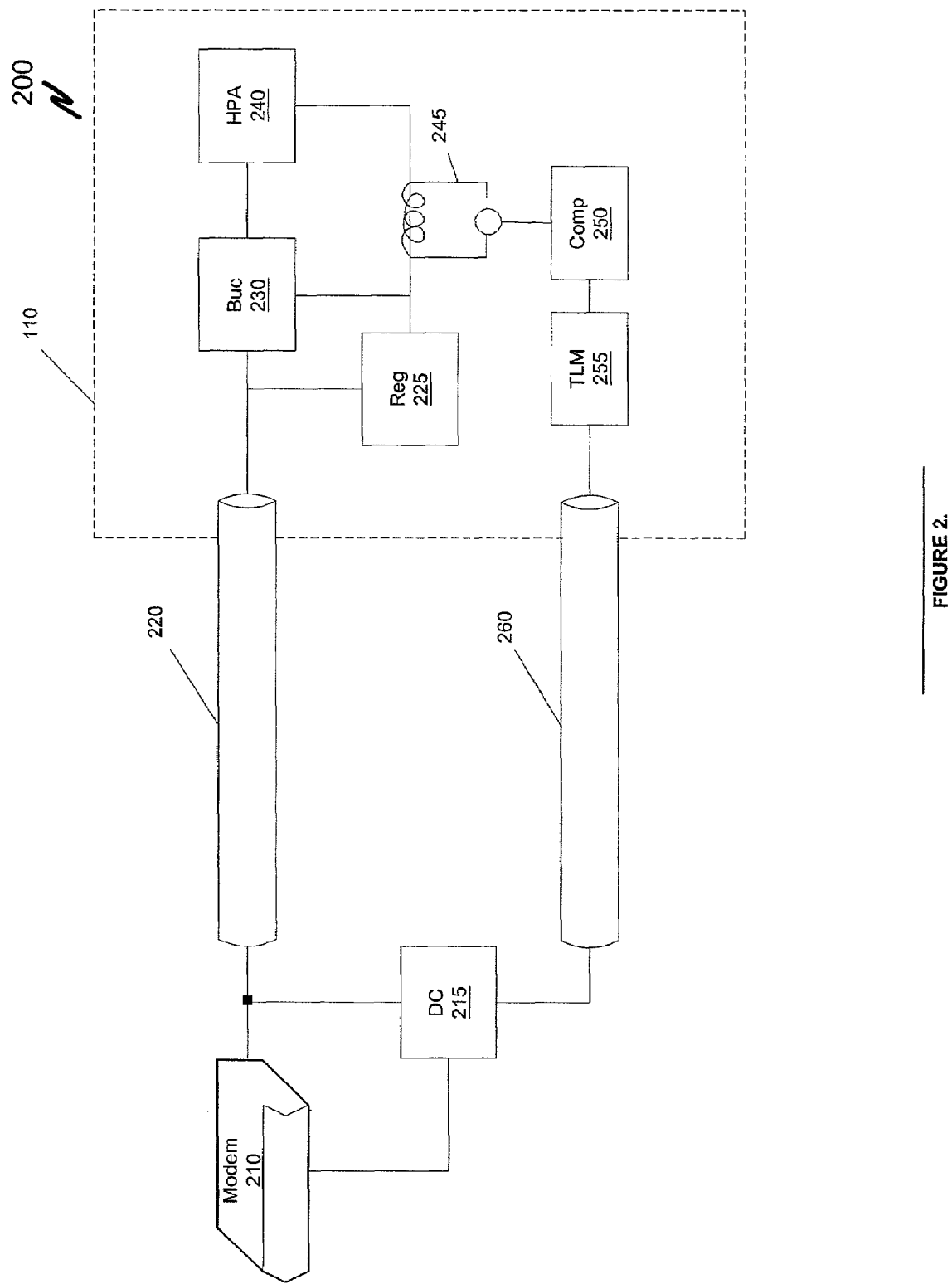
FIG. 2 is a block diagram illustrating one embodiment of a power regulation control circuit in accordance with the present invention.
Figure 3:
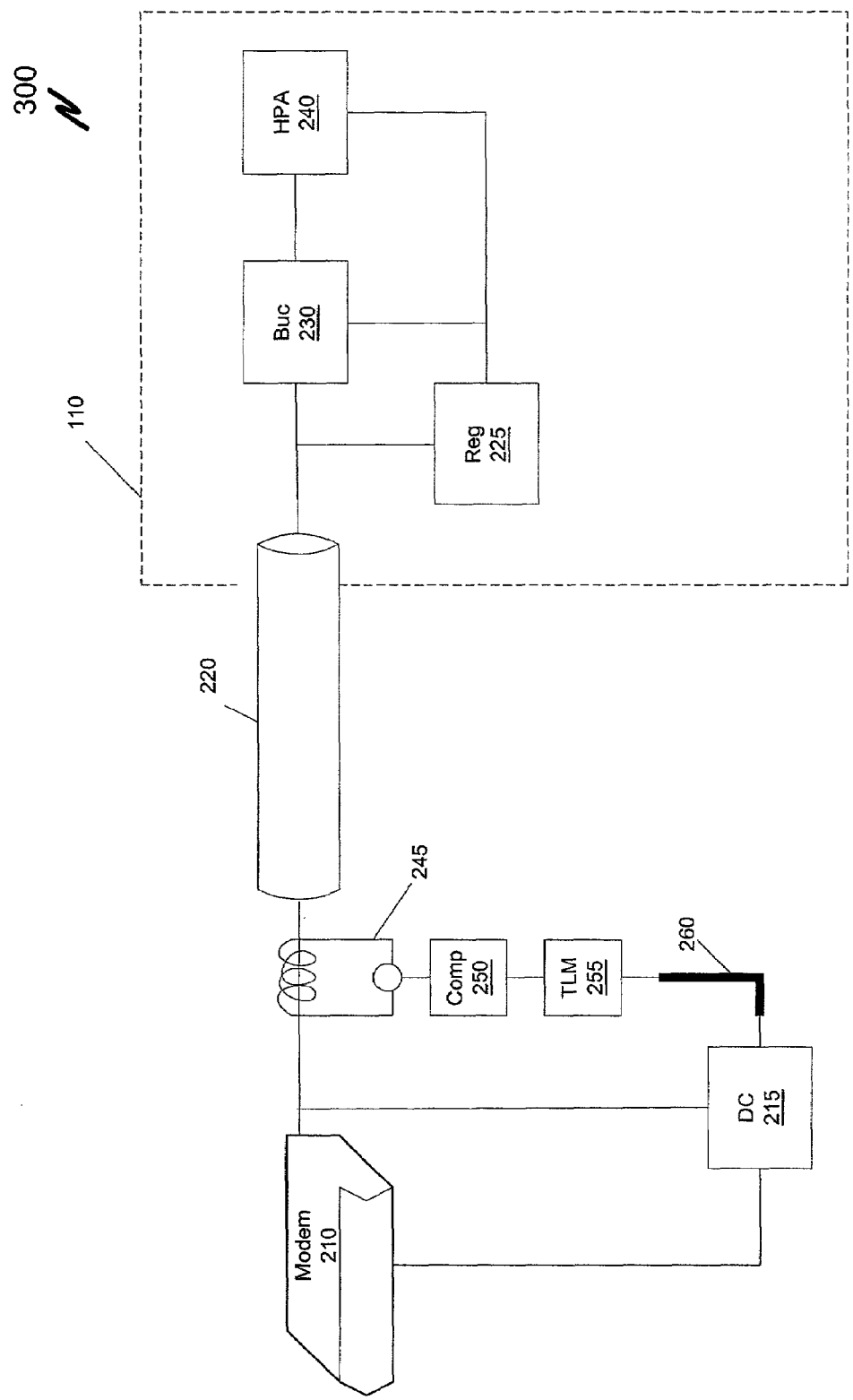
FIG. 3 is a block diagram illustrating a second embodiment of a power regulation control circuit in accordance with the present invention.

Turning now to FIG. 2, a power regulation system 200 in accordance with the present invention may comprise a satellite modem 210 and associated DC power source 215, a coaxial cable 220 or other communications conduit connecting the satellite modem 210 to a transmitter unit 110, and the transmitter unit 110. In a preferred form, a current monitor 245 is used to monitor a characteristic of a DC current that is provided by a DC current regulator circuit 225 to an input of a power amplifier circuit 240 of the transmitter unit 110. The current sensor 245 may be coupled to a comparator circuit 250, and the comparator circuit 250 may be coupled to a telemetry circuit 255 such that data descriptive of the characteristic of the monitored DC current may be provided, for example, over another coaxial cable 260 or other communications conduit to a power regulator (not shown) of the DC power source 215.

Figure 4:
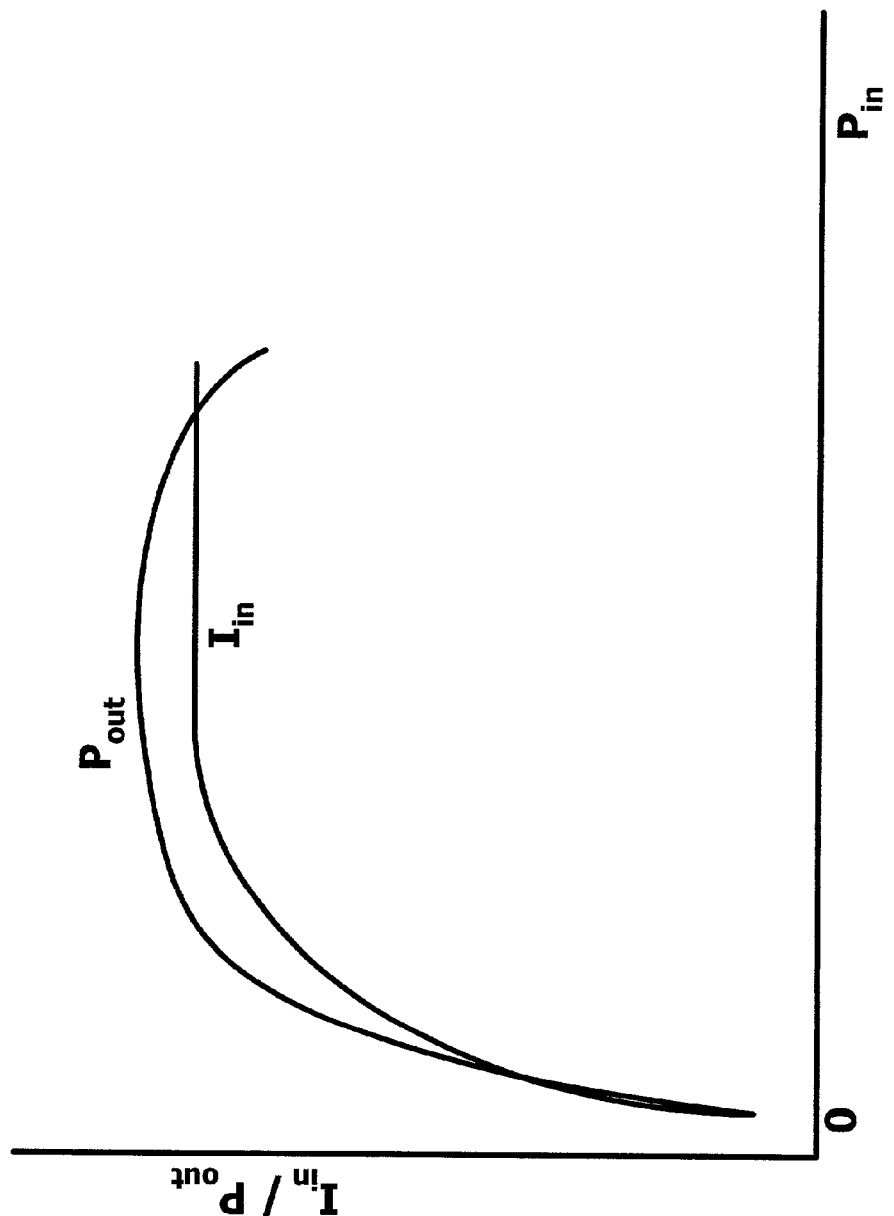
FIG. 4 is a graph illustrating a relationship between an amount of DC input current that may be drawn by a typical power amplifier and the power output of the amplifier, as an amount of power input to the amplifier is increased.

Because the current input to the power amplifier 240 will exhibit a predetermined characteristic, e.g., will plateau, as the power amplifier 240 approaches an upper limit of its range of operation, it is possible to limit the amount of power that is applied to the transmitter unit 110 upon detection of that characteristic. This characteristic is illustrated in FIG. 4. Thus, depending upon the circumstances of operation, it may be desirable to cap or limit the amount of input signal power provided to the transmitter unit 110, when the prescribed current characteristic is detected by the current monitor 245 and related circuits 250 and 255. In this fashion, a satellite or satellite communications network may be prevented from overdriving a transmitter unit 110 beyond its operational thresholds during periods of increased link attenuation.

Those skilled in the art will appreciate that, because the bulk of the power consumed by a typical transmitter unit 110 will be consumed by the power amplifier 240 provided within the transmitter unit 110, it is possible to monitor the DC current provided to the power amplifier 240 either directly, as described above, or indirectly. Indeed, after being made aware of the system described above, others have suggested that by monitoring the amount of DC current that is generated by the DC current regulator 225, it is possible to obtain a close approximation of the DC current applied to the power amplifier 240, and it is possible to determine when the overall current generated by that regulator 225 exhibits a characteristic indicating that the power amplifier is approaching its operating limits.

Similarly, as illustrated in FIG. 3, in alternative embodiments developed by others familiar with the present invention, it may be desirable to monitor a DC current component of a signal carried on the coaxial cable 220 or other transmission conduit to determine when the power amplifier 240 is approaching its operating limits. Although this embodiment employs virtually the same circuitry that is used in the embodiment illustrated in FIG. 2, this embodiment reduces the amount of signal communication that must be supported between the satellite modem 210 and the transmitter unit 110.

Those skilled in the art will appreciate, therefore, that it is possible and, indeed, equivalent to monitor either directly or indirectly the DC current that is provided to the power amplifier 240 of the transmitter unit 110 to ensure that the amplifier 240 is not pushed beyond its normal or prescribed operating limits.

Because the invention is susceptible to various modifications and alternative forms, specific examples thereof have been shown in the drawings and are herein described in detail. It should be understood, however, that the invention is not to be limited to the particular forms or methods disclosed, but to the contrary, the invention should encompass all modifications, alternatives, and equivalents falling within the spirit and scope of the appended claims.

What is claimed is:

1. A method for controlling an amount of power that may be applied to a power amplifier of a transmitter unit of a satellite-based data communications system, the method comprising:

delivering a transmission signal from a satellite modem to the transmitter unit of the satellite-based data communications system;

monitoring, at the transmitter unit, a direct current component of an input signal applied to the power amplifier of the transmitter unit to determine when the direct current component of the input signal applied to the power amplifier exhibits a predetermined characteristic, wherein said predetermined characteristic is exhibited when, in a graph of input power compared to said direct current component, said direct current component begins to plateau;

in response to control signals received from a selected element of the satellite-based data communications system, allowing for increased input signal power to be applied to the power amplifier of the transmitter unit so long as the direct current component of the input signal applied to the power amplifier does not exhibit the predetermined characteristic; and preventing increased input signal power from being applied to the power amplifier of the transmitter unit when the direct current component of the input signal exhibits the predetermined characteristic.

2. The method of claim 1, wherein the transmitter unit comprises a transmitter/receiver (transceiver) unit.

3. The method of claim 1, wherein the step of preventing increased input signal power from being applied to the power amplifier of the transmitter unit comprises controlling a level of the input signal within the transmitter unit with an automatic gain or level control circuit.

4. The method of claim 1 further comprising:
generating a signal indicative of the level of output signal power bring produced by the transmitter unit; and
transmitting, via the transmitter unit and to a satellite of the satellite-based data communications system, a signal descriptive of the level of output signal power currently being produced by the transceiver unit.

5. The method of claim 4 further comprising:
transmitting from the selected element of the satellite-based communications system to the satellite modem a signal for effecting a variation of the level of output signal power being produced by the transmitter unit.

6. The method of claim 1 wherein the selected element of the satellite-based communications system comprises either a satellite or a satellite communications network.

7. A system for regulating an amount of power provided to a power amplifier of a transmitter unit of a satellite-based data communications system, the system comprising:
a modem for delivering a transmission signal to the power amplifier of the transmitter unit and for regulating an amount of input signal power to be provided to the transmitter unit;
a current monitor, in the transmitter unit, for monitoring a level of a direct current provided by a DC current regulator to the power amplifier of the transmitter unit to determine when said level achieves a predetermined threshold; and
a circuit for preventing an increased amount of power from being provided to the power amplifier of the transmitter unit when the level of the direct current provided to the power amplifier achieves a predetermined threshold, wherein said predetermined threshold is approximately the point where the monitored direct current begins to plateau when the input power is increased.

8. The system of claim 7, wherein the transmitter unit comprises a transmitter/receiver (transceiver) unit.

9. The system of claim 7, wherein the circuit for preventing an increased amount of input signal power from being applied to the power amplifier comprises an automatic gain or level control circuit.

10. The system of claim 7, wherein the circuit for preventing an increased amount of input signal power from being applied to the power amplifier comprises a processor that discontinues an operation of the transmitter unit when the level of the direct current provided to the power amplifier achieves the predetermined threshold.

11. A circuit for regulating an amount of power to be provided from a modem to a power amplifier of a transmitter unit of a satellite-based data communications system, the circuit comprising:
means for monitoring, in the transmitter unit, an amount of current into the power amplifier of the transmitter unit to determine when said amount of current achieves a predetermined threshold; and
means for limiting the power produced by the transmitter unit when the amount of current applied to the power amplifier achieves a predetermined threshold, wherein said predetermined threshold is approximately the point where the monitored direct current approaches a plateau as the input power is increased to the power amplifier.

12. The circuit of claim 11, wherein the transmitter unit comprises a transmitter/receiver (transceiver) unit.

13. The circuit of claim 11 further comprising:
means for providing to a modem associated with the transmitter unit an indication of a strength of a signal transmitted from the transmitter unit to a satellite; and
means for varying the power produced by the transmitter unit in response to the indication of the strength of the signal transmitted from the transmitter unit to the satellite.

14. A transmitter unit power control system for use with satellite-based data communications systems, the transmitter unit power control system comprising:
a modem for providing a data signal to a transmitter unit;
a power amplifier circuit provided within the transmitter unit for amplifying the data signal and causing the amplified data signal to be transmitted to a satellite via a radio frequency communications link;
a DC current source configured to provide a DC current to at least a final stage of the power amplifier circuit;
a current monitor, provided within the transmitter unit, for monitoring a characteristic of the DC current provided by a regulator to the final stage of the power amplifier circuit;
a comparator circuit provided within the transmitter unit coupled to the current monitor and configured to determine when the direct current exhibits a predetermined characteristic; and
a telemetry circuit coupled to the comparator circuit and configured to provide a signal to a power regulator circuit that is not located in the transmitter unit, wherein the power regulator circuit is configured to limit the power level of the data signal provided to the transmitter unit when the direct current exhibits the predetermined characteristic which comprises the direct current component approaching a plateau as the input power is increased to the power amplifier.

15. The transmitter unit power control system of claim 14, wherein the current monitor is configured to directly monitor the DC current applied to the final stage of the power amplifier circuit.

16. A method for controlling a power level of an input signal applied to a power amplifier of a transmitter unit of a satellite-based telecommunications system, the method comprising:
monitoring, within the transmitter unit, a direct current component into the power amplifier to determine when the direct current exhibits a predetermined characteristic,
communicating a signal from the transmitter unit to a power regulator that is not located in the transmitter unit, wherein the signal indicates whether the direct current exhibits a predetermined characteristic, and
limiting the level of the input signal applied to the transmitter unit when the direct current exhibits the predetermined characteristic, wherein said predetermined characteristic comprises the direct current component approaching a plateau as the input power is increased.

* * * * *